(12) United States Patent
Vanzetto et al.

(10) Patent No.: US 11,396,029 B2
(45) Date of Patent: Jul. 26, 2022

(54) VALVE AND SYSTEM FOR APPLICATION OF A COVERING PRODUCT INCLUDING SUCH A VALVE

(71) Applicant: EXEL INDUSTRIES, Epernay (FR)

(72) Inventors: Denis Vanzetto, Paris (FR); Didier Faure, Paris (FR); Olivier Gourbat, Paris (FR)

(73) Assignee: EXEL INDUSTRIES, Epernay (FR)

( * ) Notice: Subject to any disclaimer, the term of this patent is extended or adjusted under 35 U.S.C. 154(b) by 166 days.

(21) Appl. No.: 17/007,222

(22) Filed: Aug. 31, 2020

(65) Prior Publication Data
US 2021/0060586 A1 Mar. 4, 2021

(30) Foreign Application Priority Data

Sep. 2, 2019 (FR) ...................................... 1909623

(51) Int. Cl.
*B05B 15/65* (2018.01)
*B05B 1/30* (2006.01)
(Continued)

(52) U.S. Cl.
CPC ............ *B05B 15/65* (2018.02); *B05B 1/3006* (2013.01); *B05B 1/3013* (2013.01); (Continued)

(58) Field of Classification Search
CPC ..... B05B 15/65; B05B 1/3006; B05B 1/3013; B05B 1/3026; B05B 1/3046; B05B 1/326; (Continued)

(56) References Cited

U.S. PATENT DOCUMENTS 2,888,033 A * 5/1959 Eickmeyer ............ B05B 1/3006
251/63
3,831,858 A * 8/1974 Casey ..................... F23D 11/26
239/464
(Continued)

FOREIGN PATENT DOCUMENTS

DE 2623039 A1 12/1977
DE 3005329 A1 8/1981
(Continued)

OTHER PUBLICATIONS

INPI Rapport de Recherche Préliminaire for Patent Application No. FR 1909623, May 8, 2020, 2 pp.
(Continued)

*Primary Examiner* — Steven J Ganey
(74) *Attorney, Agent, or Firm* — Soquel Group LLC

(57) ABSTRACT

A valve including a body having an inner central orifice and a chamber, a piston formed by a rod and by a head mounted in the chamber, the rod extending outside the body and moving in a bore of an application system. The valve includes a first sealing device around the rod on one side of the valve where the rod extends outside the body, part of the chamber being filled with a pressurized control fluid to obtain movement of the piston against the force of a spring housed in the body. The valve includes a second sealing device around the rod, between the first sealing device and the chamber. The valve includes a vent duct in the rod that communicates with the inner central orifice between the first and second sealing devices and emerges in the open air or in part of the chamber communicating with the open air.

7 Claims, 9 Drawing Sheets

(51) Int. Cl.
- *B25B 13/50* (2006.01)
- *B25B 27/24* (2006.01)
- *B05B 1/32* (2006.01)
- *B05B 9/04* (2006.01)
- *B05B 9/043* (2006.01)

(52) U.S. Cl.
CPC .......... *B05B 1/3026* (2013.01); *B05B 1/3046* (2013.01); *B05B 1/326* (2013.01); *B25B 13/50* (2013.01); *B25B 27/24* (2013.01); *B05B 9/043* (2013.01); *B05B 9/0413* (2013.01)

(58) Field of Classification Search
CPC ....... B05B 9/0413; B05B 9/043; B25B 13/50; B25B 27/24
USPC .................. 239/124, 533.1, 533.15, 583, 600
See application file for complete search history.

(56) References Cited

U.S. PATENT DOCUMENTS

| | | | |
|---|---|---|---|
| 4,162,763 A * | 7/1979 | Higgins | ................... B05B 1/10 |
| | | | 239/583 |
| 7,021,565 B2 * | 4/2006 | Coldren | ............. F02M 63/0068 |
| | | | 239/533.1 |

FOREIGN PATENT DOCUMENTS

| JP | 2010207666 A | 9/2010 |
|---|---|---|
| JP | 2010207667 A | 9/2010 |

OTHER PUBLICATIONS

EPO Patent Abstracts of Japan for Publication No. 2010207666.
EPO Patent Abstracts of Japan for Publication No. 2010207667.

* cited by examiner

VALVE AND SYSTEM FOR APPLICATION OF A COVERING PRODUCT INCLUDING SUCH A VALVE

CROSS-REFERENCE TO RELATED APPLICATION

This application claims priority of French Patent Application No. 19 09623, filed on Sep. 2, 2019.

FIELD OF THE INVENTION

The present invention relates to a valve and a system for application of a covering product including such a valve.

BACKGROUND OF THE INVENTION

The systems for application of covering products, such as paint sprayers, include at least one valve controlling a needle maneuverable to allow circulation of paint. The valve is generally controlled by injecting pressurized control air into a chamber. The pressurized air acts on a piston controlling the needle. Such a valve includes sealing devices preventing the paint from entering the valve toward the chamber on the one hand, and preventing the pressurized control air from escaping from the chamber and other fluids from entering the chamber on the other hand.

Such valves are equipped with a vent, that is, a channel that makes it possible, in the case of a valve that begins to leak at the seal on the paint side, to direct the paint toward the outside of the sprayer and above all to prevent paint from entering the control air circuit so as to protect the control part of the valve. The vents also make it possible to locate a leaking valve.

On some current valves, a piercing is made in the body of the valve to direct the paint to the outside of the valve, then through a spot facing and drilling in the body of the sprayer, toward the outside of the sprayer.

This type of vent can cause damage on the sprayers due to any dried paint residues after a leak, which can plug the vents in the body of the sprayer.

SUMMARY OF THE DESCRIPTION

The invention aims to address these drawbacks by proposing a new valve for a system for the application of a covering product, on which the vent is made so as to avoid damage on the system for the application of a covering product.

To that end, the invention relates to a valve for a system for the application of a covering product, this valve including a body including an inner central orifice and a chamber, the valve also including a piston formed by a rod mounted in the inner orifice and by a piston head mounted in the chamber, the rod extending outside the body and being intended to move in a bore of the application system in which the valve is intended to be mounted and in which the pressurized covering product or another fluid circulates, the valve including a first sealing device formed by a dynamic seal housed in the body around the piston rod on one side of the valve where the piston rod extends outside the body, part of the chamber being intended to be filled with a pressurized control fluid so as to obtain the movement of the piston against the force of a spring housed in the body, the valve including a second sealing device formed by a dynamic seal housed in the body around the piston rod between the first sealing device and the chamber. This valve includes a vent duct provided in the rod of the piston and communicating with the inner central orifice between the first sealing device and the second sealing device and emerging in the open air or in part of the chamber communicating with the open air.

Owing to the invention, the vent function of the valve is performed inside the valve. If the valve leaks on the paint side, it then suffices to change the valve, and the problems of the known vents, in particular clogs in the body of the application system, are avoided, which reduces the maintenance operations. The overall cost of the product application system is also reduced.

According to advantageous but optional aspects of the invention, such a valve may incorporate one or more of the following features, considered in any technically allowable combination:

The vent duct includes at least one radial orifice emerging in a cavity of the inner central orifice located axially between the first sealing device and the second sealing device.

The valve includes an indicator secured to the piston configured to protrude outside the body based on a position of the piston, and the vent duct passes through the indicator.

The vent duct is coaxial to a central axis of the piston.

The vent duct emerges in the part of the chamber communicating with the open air, and in which the spring is mounted.

The valve includes a duct passing through the body between an outer surface of the body and the cavity of the inner central orifice located axially between the first sealing device and the second sealing device so as to channel, toward the vent duct, a leak from a static sealing element inserted between the body and the bore.

The invention also relates to an application system of a covering product including a valve as mentioned above.

BRIEF DESCRIPTION OF THE DRAWINGS

The invention will be better understood, and other advantages thereof will appear more clearly, in light of the following description of a valve and a system for application of a covering product according to its principle, provided as a non-limiting example and in reference to the drawings, in which.

DETAILED DESCRIPTION

Figure 1:
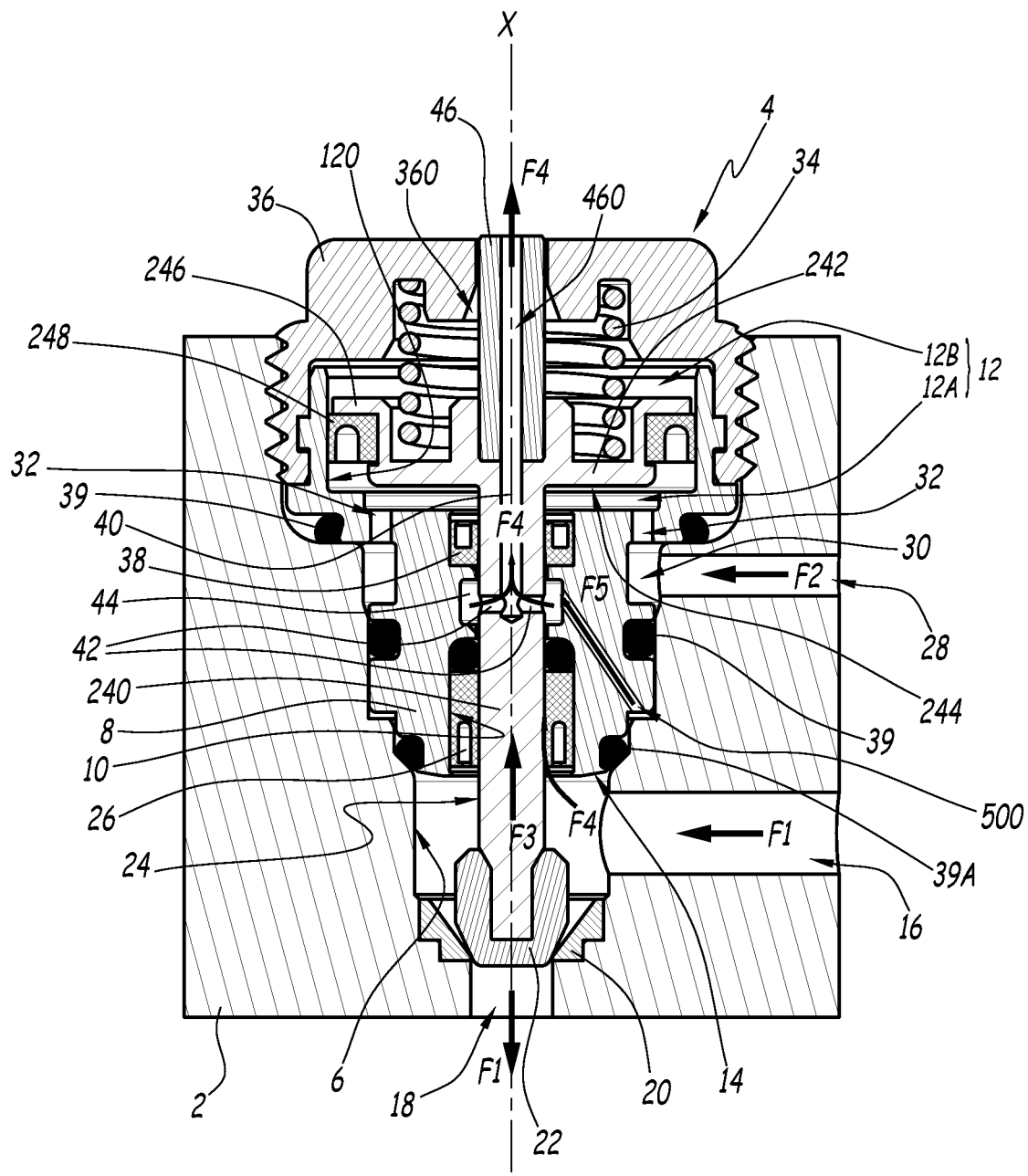
FIG. 1 shows a sectional view of a valve according to the invention mounted in a spraying system according to the invention.

FIG. 1 shows part of a system 2 for application of a covering product, for example, a sprayer for paint, varnish, anticorrosion covering, or any other conceivable type of product. System 2 includes a valve 4 mounted in a bore 6 of system 2.

Valve 4 includes a body 8 including an inner central orifice 10 and a chamber 12. Orifice 10 and chamber 12 are centered about a central axis X. Hereinafter, the terms "axial", "radial", "axially", "radially" are used in reference to central axis X.

Orifice 10 and chamber 12 communicate fluidly. Orifice 10 emerges from body 8 at an end face 14 of body 8, in bore 6.

System 2 includes a fluid intake duct 16 in bore 6, and a fluid outlet duct 18 that extends orifice 6. In some applications, the intake duct and the outlet duct can be reversed. Intake duct 16 and outlet duct 18 are primarily intended for circulation of the covering product, but other fluids, in particular air or cleaning solvent, may also circulate in intake duct 16 and outlet duct 18.

Between intake duct 16 and outlet duct 18, bore 6 includes a seat 20, against which a needle 22 of valve 4 cooperates so as to close or allow the circulation of the covering product from intake duct 16 to outlet duct 18, along arrows F1. In a variant that is not shown, seat 20 may also be machined directly in the material of application system 2. Intake duct 16 is connected to a covering product reservoir, not shown, or to a pump, in particular of the "circulating" type, and outlet duct 18 is connected to an application or spraying device, not shown, such as a gun.

Valve 4 includes a piston 24 formed by a rod 240 mounted in inner orifice 10 and by a piston head 242 housed in chamber 12. Rod 240 extends outside body 8 and bears needle 22. Rod 240 is intended to be translated along central axis X in bore 6 in which the pressurized covering product circulates along arrows F1.

Valve 4 includes a first sealing device 26 housed in body 8 around piston rod 240 on the side of valve 4 where rod 240 extends outside body 8. The first sealing device 26 is a dynamic seal making it possible to prevent covering product from infiltrating between piston rod 240 and body 8 toward chamber 12, during the translational movements of piston rod 240.

Piston head 242 has an axial surface 244 perpendicular to central axis X. Piston head 242 extends radially in a skirt 246 in which a sealing device 248 is housed, which guarantees dynamic sealing between piston head 242 and an inner cylindrical wall 120 of chamber 12, during translational movements of piston head 242 in chamber 12. Sealing device 246 divides the chamber 12 into two parts 12A and 12B that are fluidly isolated because sealing device 246 prevents fluid from circulating around piston head 242 between part 12A and part 12B.

Part 12A of chamber 12 is located on the side of piston rod 240. Axial surface 244 is located in part 12A. Spraying system 2 includes an intake duct 28 for a pressurized control fluid, which emerges in a peripheral groove 30 of body 8. Peripheral groove 30 communicates with part 12A by axial orifices 32. Part 12A of chamber 12 is intended to be filled with the pressurized control fluid, for example, air, so as to control the axial movement of piston 24. Valve 4 includes a spring 34 mounted in part 12B of chamber 12. Spring 34 is centered on central axis X and exerts a resilient force on piston head 242 so as to drive the latter downward, that is to say to push it into the part 12A. Spring 34 bears against a part of piston head 242 and against a stopper 36 of valve 4, which is fastened to body 8 and screwed in application system 2.

Under the control action of the compressed air injected into part 12A via duct 28 (arrow F2), piston 24 is moved upward (arrow F3) by the force exerted by the pressure of the pressurized air on axial surface 244, against the force of spring 34. This results in lifting needle 22 off of seat 20 and allowing the passage of covering product toward outlet duct 18.

Valve 4 includes a second sealing device 38 housed in body 8 around piston rod 240, between first sealing device 26 and the chamber 12. Sealing device 38 is a dynamic seal that prevents air from leaving chamber 12 during translation of piston rod 240, as well as preventing other fluids from entering part 12A, the pressurized control air circuit necessarily having to be preserved from any intrusion of outside fluid, in particular covering product.

Valve 4 also includes several static sealing devices ensuring tightness between bore 6 and body 8. These devices are formed by O-rings 39 housed in grooves of body 8 and which bear against bore 6, in particular an O-ring 39A ensuring tightness between bore 6 and body 8 around end face 14.

In the case where first sealing device 26 experiences a failure, which may cause a leak and the inflow of covering product toward chamber 12, valve 4 includes a vent duct 40 making it possible to discharge the covering product that has leaked toward a location separate from part 12A of chamber 12.

Vent duct 40 is provided in piston rod 240 and communicates with the inner central orifice 10 between first sealing device 26 and second sealing device 38 and emerges in the open air or in part of chamber 12 communicating with the open air. Vent duct 40 is formed by a duct encompassed in the material forming piston rod 240. Thus, vent 40 is provided in valve 4 itself, which does not require a vent channel in application system 2. The defective valve may be changed without it being necessary to intervene on the application system.

In one embodiment, vent duct 40 is coaxial to central axis X of piston 24. Vent duct 40 includes at least one radial orifice 42 emerging in a cavity 44 of inner central orifice 10, located axially between first sealing device 26 and second sealing device 38. Thus, any leak of covering product passing through first sealing device 26 accumulates in cavity 44, then rejoins vent duct 40 via radial orifices 42, along arrows F4. Vent duct 40 may include several radial orifices 42 distributed around central axis X.

Valve 4 includes an indicator 46, formed by a part secured to piston 24 and configured to protrude outside body 8 based on the axial position of piston 24. Indicator 46 is a cylindrical part coaxial to central axis X, fastened to piston head 242, and which is inserted into a hole 360 of stopper 36. When piston 24 is pushed upward under the action of the compressed control air, indicator 46 protrudes outside stopper 36 and is visible from the outside.

In the illustrated example, vent duct 40 extends in a piercing 460 that passes through indicator 46, and the covering product that has leaked through vent duct 40 is therefore expelled to the open air along arrows F4. If the first sealing device 26 fails, a covering product leak is therefore discharged to the open air through piston rod 240, then indicator 46, that is to say, components of valve 4, without passing through spraying device 2. This does not require a specific valve that must be cleaned in case of leak. Furthermore, the covering product is oriented via vent 40 away from part 12A to prevent contamination of the control air circuit.

According to one variant that is not shown, vent duct 40 cannot be coaxial to central axis X.

Figure 2:
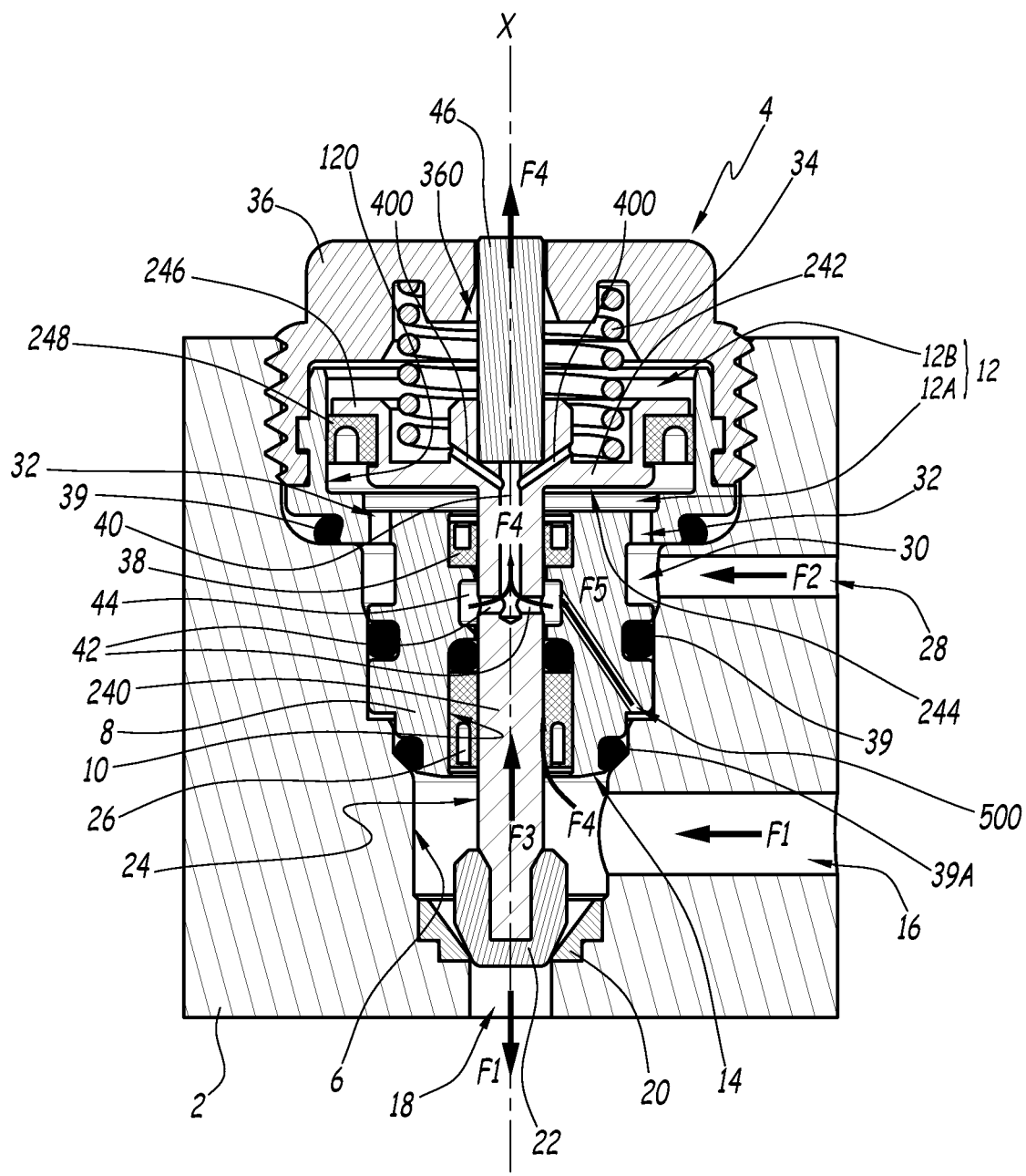
FIG. 2 is a sectional view similar to FIG. 1 showing a variant of the valve of FIG. 1.
Figure 3:
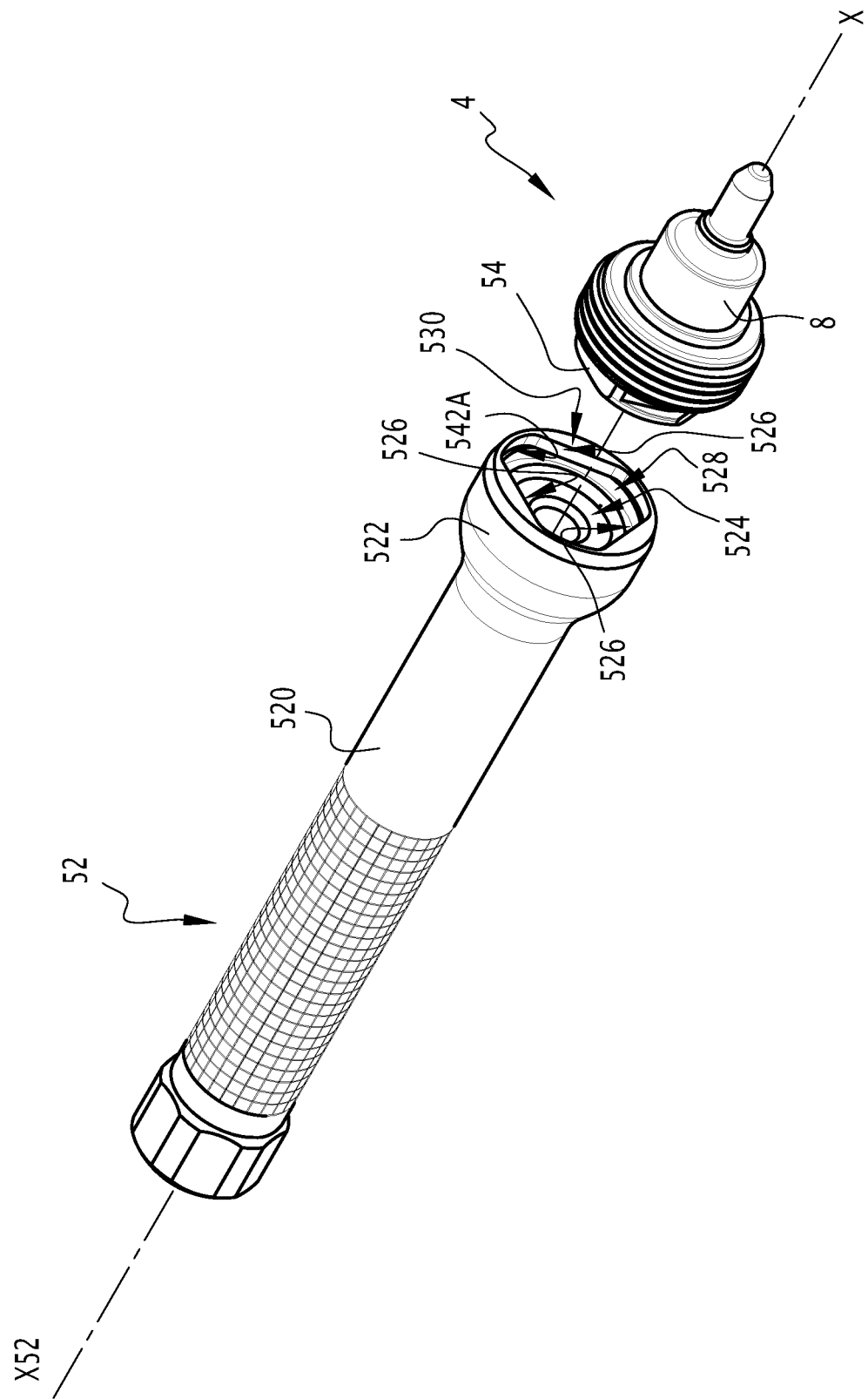
FIG. 3 is a perspective view of the valve of FIG. 1 and a tool according to the invention.

According to another variant shown in FIG. 2, vent duct 40 cannot pass through indicator 46 in order to expel the covering product to the open air. For example, vent duct 40 may follow a path inside piston rod 240 and piston head 242, through ducts 400, which emerge in part 12B of chamber 12. Part 12B communicates with the open air via hole 360 of stopper 36, through which indicator 46 slides along central axis X. The covering product may therefore be discharged from part 12B via hole 360. A certain quantity of covering product that has leaked may accumulate around indicator 46 and spring 34, and advantageously block valve 4 in the closed position. Part 12A remains protected from the covering product leak by dynamic sealing device 248. Blocking of valve 4 in the closed position results in quickly indicating a malfunction of valve 4.

According to a variant that is not shown, indicator 46 may also not be coaxial to central axis X. Indicator 46 may also not be a separate part from piston 24. Indicator 46 and piston 24 may be integral and form a monobloc part passed all the way through by vent duct 40 between radial orifices 42 and the open air at stopper 36.

According to one optional aspect, valve 4 may include a piercing 500 passing through body 8 between bore 6 and cavity 44. The opening of piercing 500 is provided behind seal 39A relative to end face 14. Thus, in case of a sealing problem at seal 39A, a leak between an outer surface of body 8 and bore 6 is channeled by piercing 500 and oriented toward cavity 44, along arrow F5, then toward radial orifices 42 and vent duct 40.

An additional aspect of valve 4, a tool 52 for assembling and disassembling valve 4 and the operation of this tool 52 are described in reference to FIGS. 3-9.

Valve 4 includes projecting or recessed shapes on a peripheral part, configured to cooperate with projecting or recessed shapes of tool 52. These projecting or recessed shapes are configured to transmit rotational movement to valve 4, and to be secured to tool 52 during disassembly of valve 4. The peripheral part is formed by a stopper 54 with a particular shape shown in FIG. 4, and the primary function of which is similar to that of stopper 36 of FIG. 1: stopper 54 is fastened to body 8 and screwed in application system 2. To that end, stopper 54 includes an outer thread 540.

The projecting or hollow shapes provided on stopper 54 include a peripheral profile 542 and a peripheral profile 544, located behind peripheral profile 542 relative to an outer end 546 of valve 4 borne by an axial surface of stopper 54. Peripheral profiles 542 and 544 are staged along central axis X, peripheral profile 542 being closest to end 546.

Figure 4:
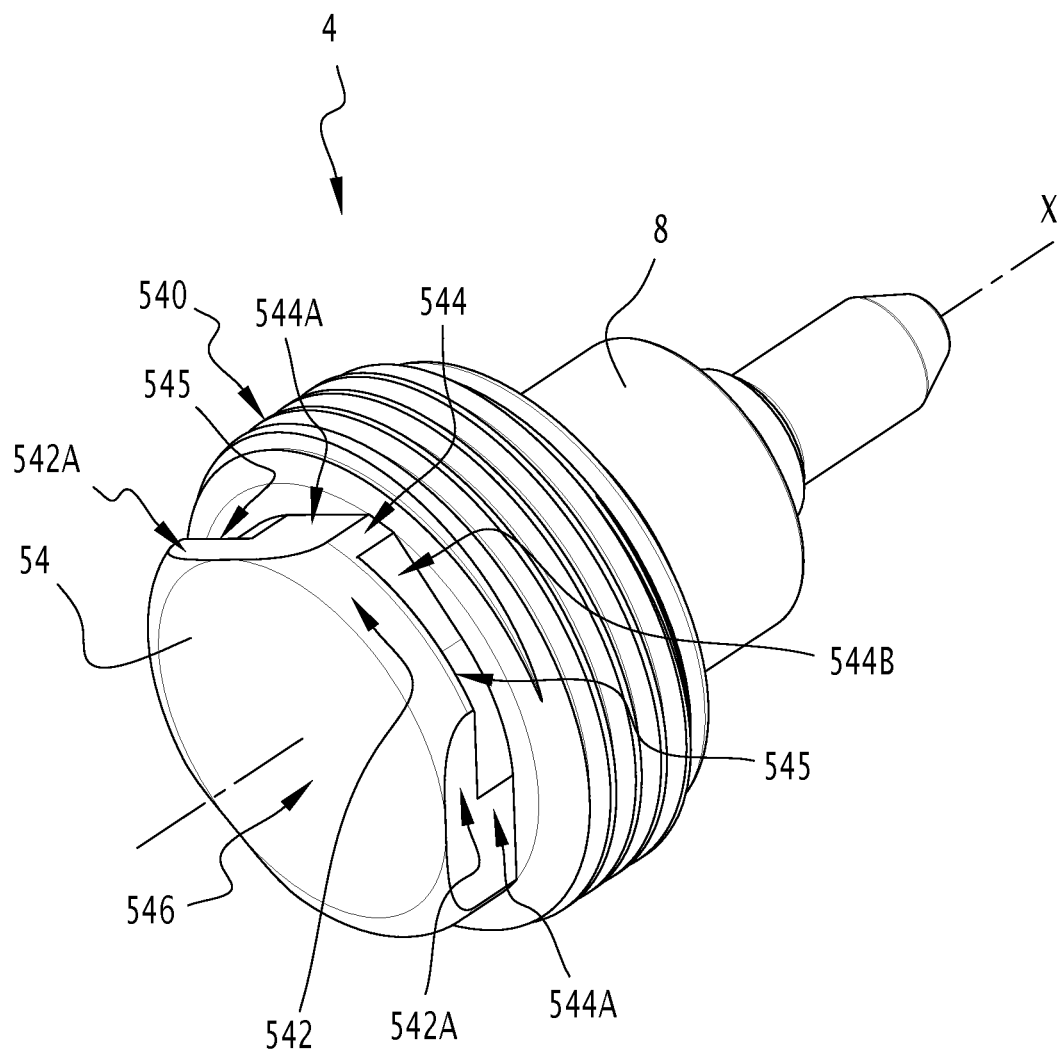
FIG. 4 is a perspective view of the valve from an opposite angle relative to FIG. 3.

Peripheral profile 542 has three planar surfaces 542A, which extend parallel to central axis X, and form breaks in the cylindrical shape of stopper 54. Peripheral profile 544 includes three planar surfaces 544A that are aligned with the three planar surfaces 542A of peripheral profile 542, and three planar surfaces 544B that are angularly offset relative to the three planar surfaces 542A. "Aligned" means that planar surfaces 544A are located at least partially in the extension along central axis X of planar surfaces 542A and form a same plane. "Angularly offset" means that surfaces 544B are located in angular sectors that are offset relative to the angular sectors in which planar surfaces 542A extend, such that the respective planes formed by planar surfaces 542A and 544B are secant. This angular offset makes it possible for planar surfaces 544B to form axial shoulders 545 that are recessed relative to peripheral profile 542. As shown in FIG. 4, planar surfaces 544B are withdrawn from the cylindrical part of peripheral profile 542.

Tool 52 includes projecting or recessed shapes on a peripheral part, configured to cooperate with the projecting or recessed shapes provided on the stopper of valve 4. These projecting or recessed shapes of tool 52 are configured to transmit rotational movement to valve 4, and to be secured to valve 4, during assembly or disassembly of valve 4.

Tool 52 extends along a central axis X52 and includes a handle 520 and an endpiece 522 having a bore 524. The projecting or hollow shapes of tool 52 are provided on an inner peripheral surface 524A of bore 524. The inner peripheral surface 524A includes three planar peripheral surfaces 526, equal to the number of planar surfaces 542A of peripheral profile 542 of valve 4. Planar surfaces 526 are parallel to central axis X52 in the same way that surfaces 542A are parallel to central axis X. Peripheral surface 524A also includes a groove 528 radially withdrawn from planar peripheral surfaces 526. Groove 528 is located behind planar surfaces 526 relative to a front end 530 of tool 52. Groove 528 forms an axial shoulder 527 configured to receive part of valve 4 by securing valve 4 with tool 52.

Groove 528 includes a resilient element 529 that exerts, when valve 4 is received in tool 52, a resilient force oriented along central axis X52 against the part of valve 4 that is received in groove 528. This resilient element 529 may, for example, be an O-ring. In a variant that is not shown, this resilient element may also be a spiral spring or a lock washer (Belleville washer).

In a variant that is not shown, peripheral profile 542 may include a different number of planar surfaces, more generally at least one planar surface. Likewise, peripheral profile 544 may have a number of planar surfaces aligned with the planar surfaces of peripheral profile 542 different from three, more generally at least one, and at least one planar surface that is angularly offset relative to the planar surface(s) of peripheral profile 542. As for the planar surfaces of peripheral profiles 542 and 544, tool 52 may have a number of planar surfaces 526 different from three, more generally at least one planar surface.

Figure 5:
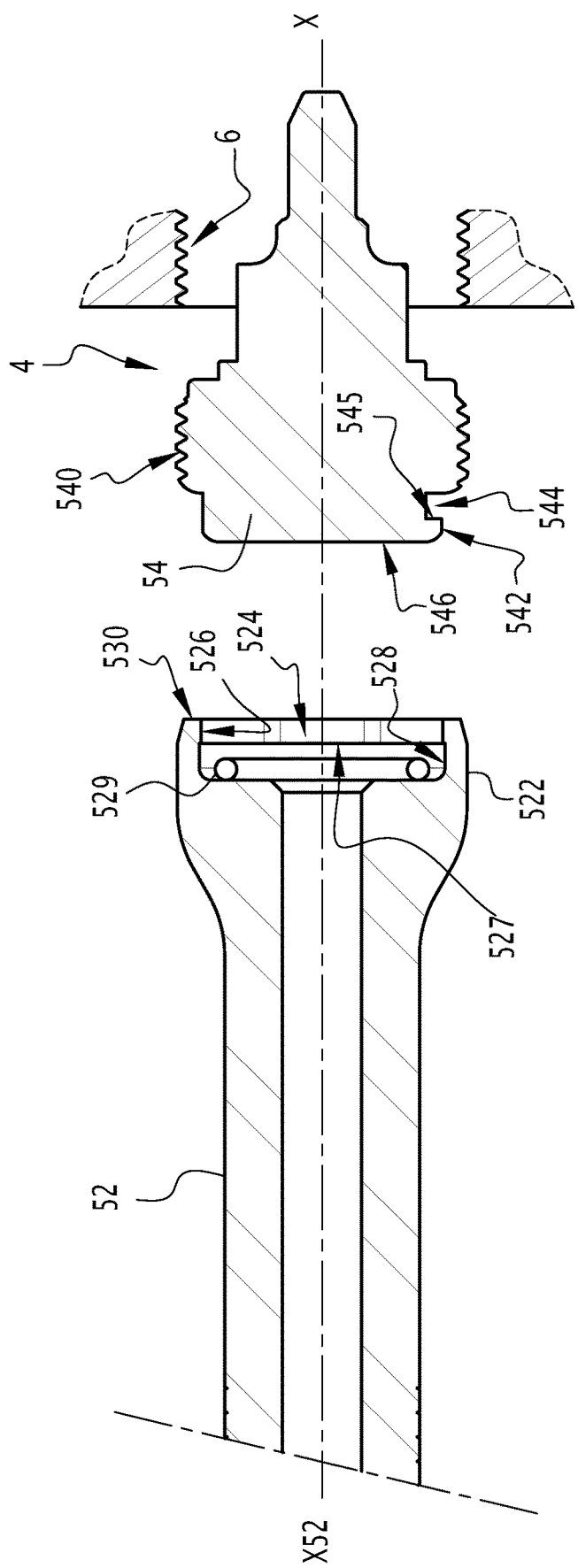
FIG. 5 is a longitudinal sectional view of the valve and the tool as shown in FIG. 3.
Figure 6:
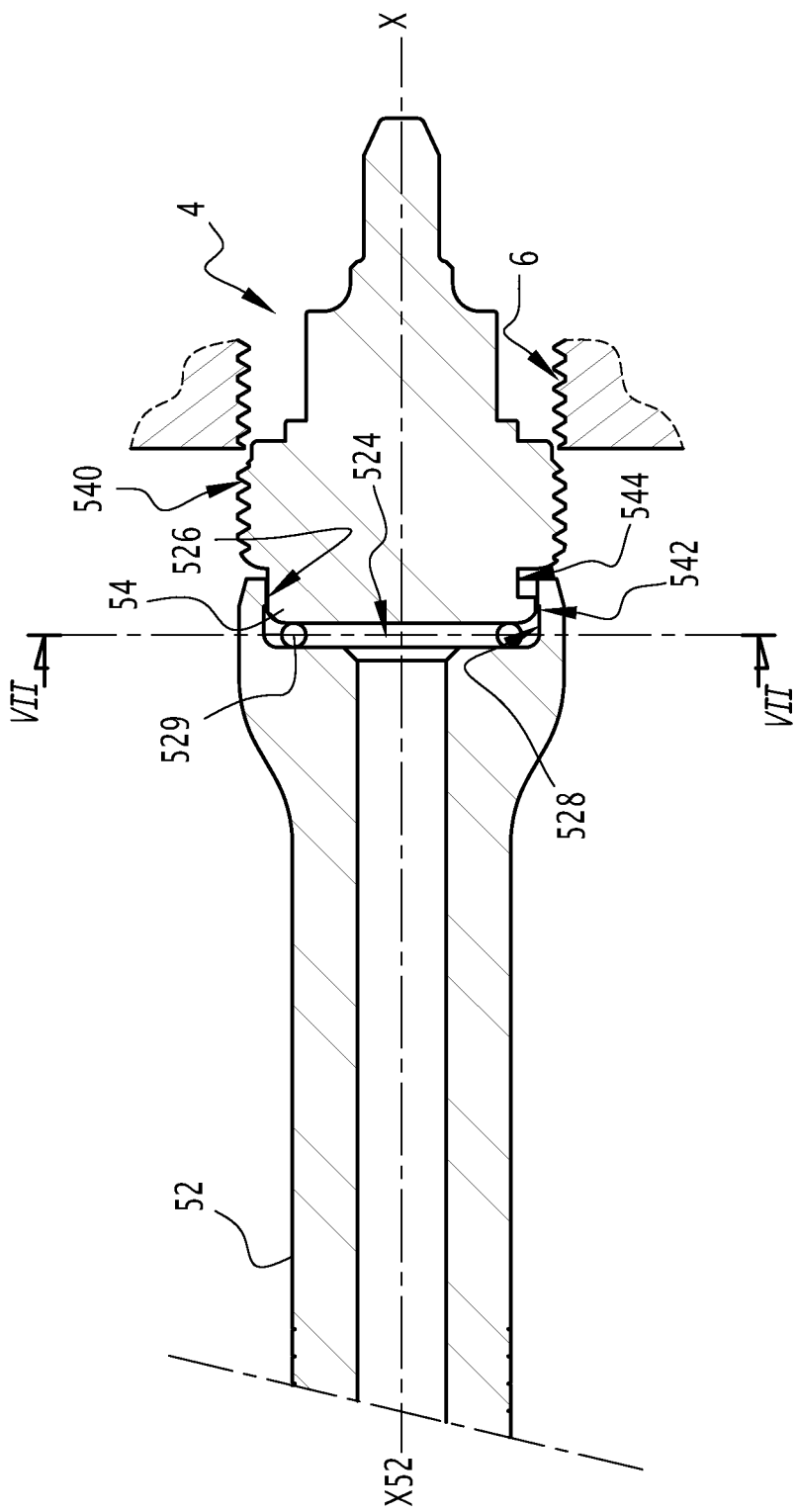
FIG. 6 is a longitudinal sectional view of the valve engaged in the tool in an assembly configuration.
Figure 7:
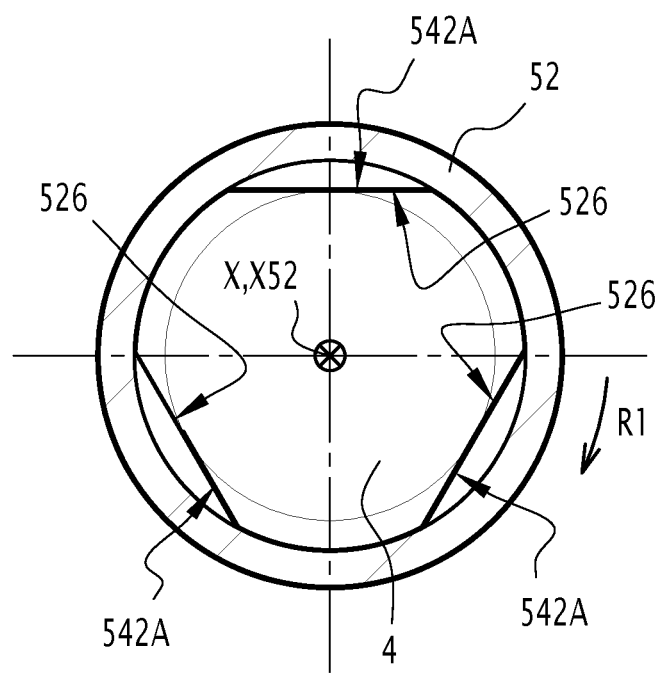
FIG. 7 is a cross-sectional view of the tool and the valve along plane VII.

The operation of tool 52 with valve 4 is described hereinafter. FIGS. 5, 6 and 7 show the assembly of valve 4 in its housing. Valve 4 is positioned in its bore 6, then tool 52 is brought closer to valve 4 such that central axes X and X52 are combined (FIG. 5).

When endpiece 522 is pushed into stopper 54 (FIG. 6) such that peripheral profile 542 is at least partially axially aligned with planar surfaces 526, planar surfaces 542A and 544A cooperate by planar contact with planar surfaces 526 (FIG. 7, in which resilient element 529 is omitted). By imparting a rotational screwing movement along arrow R1 to tool 52, an operator can therefore screw valve 4 into bore 6.

Figure 8:
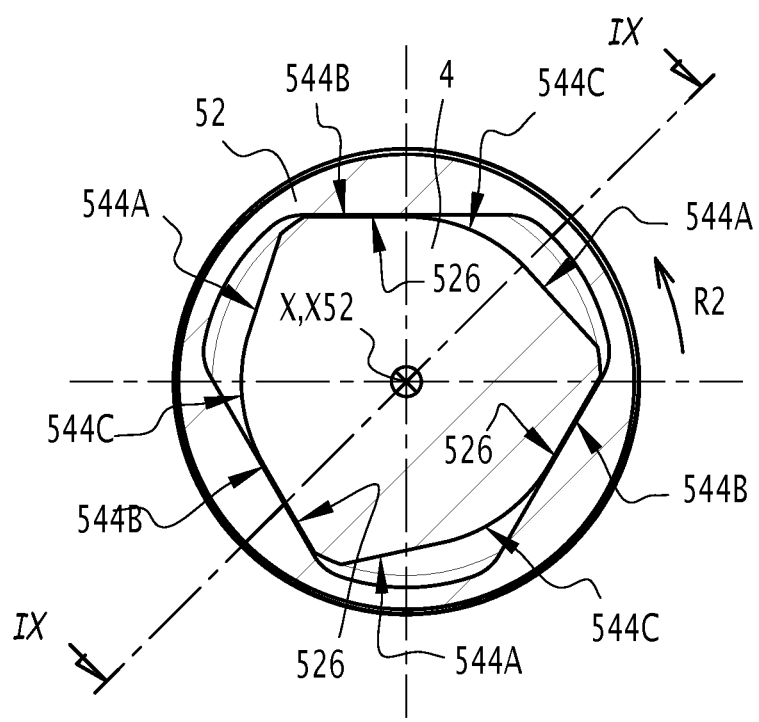
FIG. 8 is a cross-sectional view of the valve and the tool assembled along plane VIII in FIG. 9.
Figure 9:
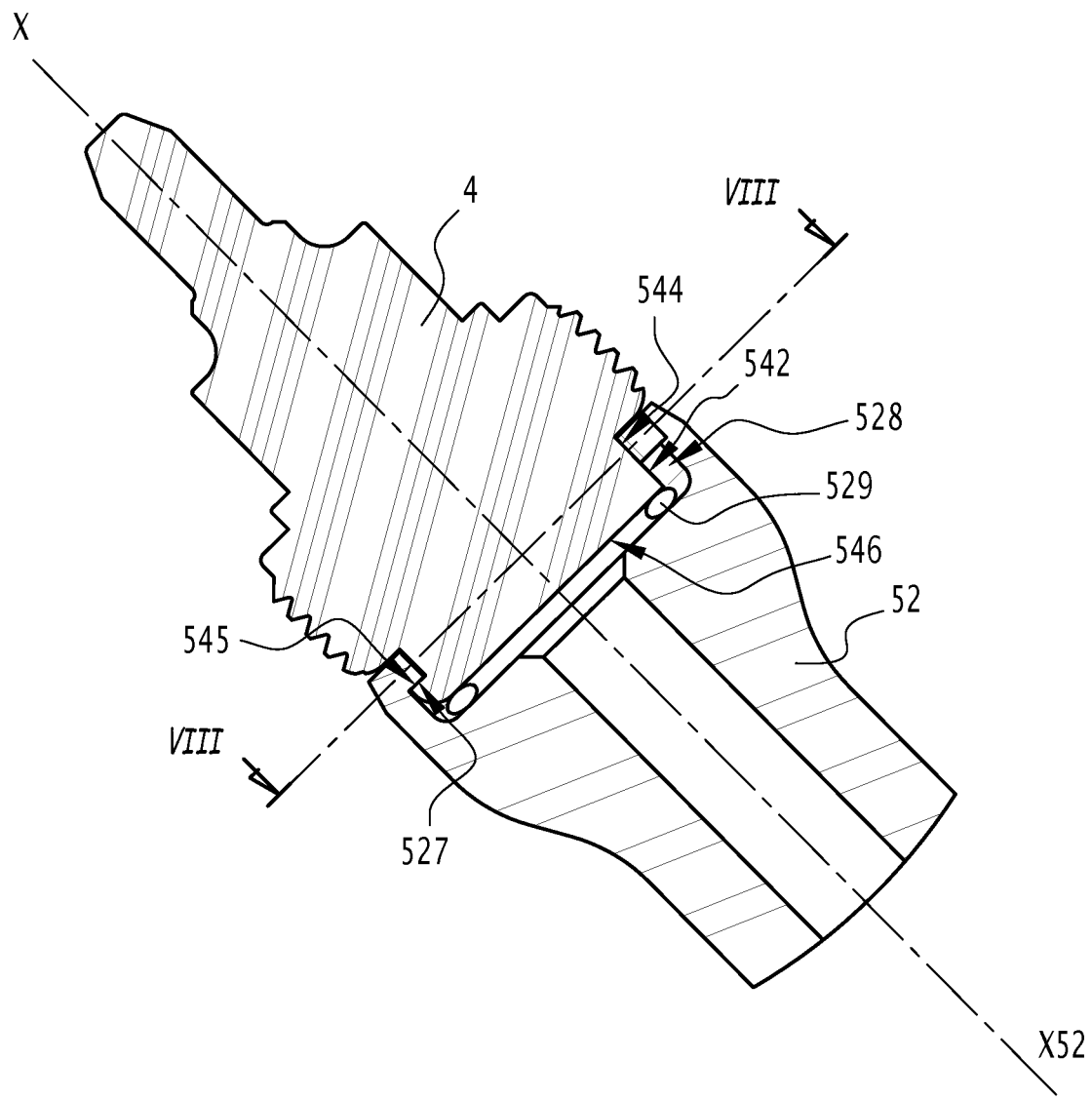
FIG. 9 is a longitudinal sectional view along plane IX of the assembled valve and tool.

When the operator wishes to unscrew valve 4 and remove it, he pushes tool 52 in more deeply, such that resilient element 529 is crushed. The peripheral profile 542 is axially aligned with groove 528 (FIG. 9). Next, the operator exerts a rotation in the unscrewing direction along arrow R2, such that surfaces 526 pivot around central axis X until they come into planar contact with planar surfaces 544B (FIG. 8). This rotation is allowed by the fact that peripheral profile 544 has, at the junction of planar surfaces 544A and 544B, rounded surfaces 544C that allow the rotation in the unscrewing direction.

In this configuration, peripheral profile 542 is blocked in groove 528 by insertion of planar surfaces 526 of tool 52 into the withdrawn reliefs formed by peripheral profile 544.

Shoulders 527 of tool 52 then axially oppose shoulders 545 of valve 4 and prevent removal of tool 52 from valve 4. The resilient force exerted by resilient element 529 tends to push valve 4 back outside bore 544 and therefore locks the contact between shoulders 527 and 545. Valve 4 and tool 52 then form an integral assembly. Valve 4 and tool 52 form a "bayonet" assembly.

By continuing the rotation in the unscrewing direction, the operator exerts planar contact between surfaces 526 and 544B that makes it possible to unscrew valve 4. Once it is unscrewed from bore 6, valve 4 may be removed easily, even from a hard-to-reach location, since valve 4 stays attached to endpiece 522 of tool 52. Valve 4 stays secured to tool 52 and does not risk falling.

This possibility of attachment of valve 4 to endpiece 522 may also be used during assembly of valve 4 in a hard-to-reach location. The operator may fasten valve 4 to tool 52 before assembly, by pushing it into bore 524, then turning it in the unscrewing direction. After having mounted valve 4 in its bore 6, the operator then turns tool 52 in the screwing direction. Valve 4 will then rotate freely and screw itself until the screwing meets with resistance. The rotational torque of tool 52 then overcomes the force exerted by the resilient element, and tool 52 rotates relative to valve 4 until cooperation is obtained of surfaces 526 with surfaces 542A and 544A. The screwing may then be continued until locking.

Tool 52 and the recessed/projecting reliefs provided on valve 4 therefore make it possible to use the same tool for assembly and disassembly of the valve. The means allowing assembly and disassembly both being provided on a same endpiece 522 of tool 52, it is not necessary to rotate it in order to perform either operation. The possibility of securing valve 4 and tool 52 by a bayonet assembly makes it possible to assemble or disassemble valve 4 easily in hard-to-reach locations. Unscrewing of the valve and its removal may in particular be performed in a single operation, unlike known techniques in which unscrewing and removal are done with two different tools that sometimes require tedious exchanges if the valve is not unscrewed enough.

The features of the embodiments and alternatives described above may be combined to form new embodiments of the invention in the context of the claims.

The invention claimed is:

1. A valve for a system for the application of a covering product, comprising:
   a body comprising:
      an inner central orifice;
      a chamber; and
      a spring;
   a piston comprising:
      a rod mounted in said inner orifice, the rod extending outside said body and being intended to move in a bore of the application system in which the valve is intended to be mounted and in which a pressurized covering product or another fluid circulates; and
      a piston head mounted in said chamber;
   a first sealing device formed by a dynamic seal housed in said body around said piston rod on one side of the valve where said piston rod extends outside said body, part of said chamber being intended to be filled with a pressurized control fluid so as to obtain movement of said piston against the force of said spring housed in said body;
   a second sealing device formed by a dynamic seal housed in said body around said piston rod between said first sealing device and said chamber; and
   a vent duct provided in said rod of said piston and communicating with said inner central orifice between said first sealing device and said second sealing device, and emerging in the open air or in part of said chamber communicating with the open air.

2. The valve according to claim 1, wherein said vent duct comprises at least one radial orifice emerging in a cavity of said inner central orifice located axially between said first sealing device and said second sealing device.

3. The valve according to claim 2, comprising a duct passing through said body between an outer surface of said body and the cavity of said inner central orifice located axially between said first sealing device and said second sealing device so as to channel, toward said vent duct, a leak from a static sealing element inserted between said body and the bore.

4. The valve according to claim 1, further comprising an indicator secured to said piston configured to protrude outside said body based on a position of said piston, and wherein said vent duct passes through the indicator.

5. The valve according to claim 1, wherein said vent duct is coaxial to a central axis of said piston.

6. The valve according to claim 1, wherein said vent duct emerges in the part of said chamber communicating with the open air, and in which said spring is mounted.

7. An application system of a covering product comprising a valve according to claim 1.

* * * * *